(12) United States Patent
Yoda (10) Patent No.: US 7,738,656 B2
(45) Date of Patent: Jun. 15, 2010

(54) PORTABLE TERMINAL DEVICE

(75) Inventor: Masaharu Yoda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 730 days.

(21) Appl. No.: 10/924,494

(22) Filed: Aug. 24, 2004

(65) Prior Publication Data

US 2005/0049017 A1 Mar. 3, 2005

(30) Foreign Application Priority Data

Aug. 29, 2003 (JP) ............................. 2003-307224

(51) Int. Cl.
*H04M 9/00* (2006.01)

(52) U.S. Cl. .............................. 379/433.01; 379/433.03; 379/433.04; 379/433.11; 379/433.13; 455/575.1; 455/575.3; 455/575.4

(58) Field of Classification Search ............. 455/575.3, 455/575.1, 90.3, 550, 556, 557, 550.1, 573.1, 455/90.1, 566, 575.4; 379/433.03, 433.04, 379/433.11, 433.12, 433.13, 16; 345/659, 345/358, 660

See application file for complete search history.

(56) References Cited

U.S. PATENT DOCUMENTS

| | | | | |
|---|---|---|---|---|
| 6,549,789 B1 * | 4/2003 | Kfoury | ..................... | 455/550.1 |
| 6,766,182 B2 * | 7/2004 | Janninck et al. | .......... | 455/575.3 |
| 6,941,618 B2 * | 9/2005 | Kim | ............................. | 16/337 |
| 6,965,413 B2 * | 11/2005 | Wada | ..................... | 455/575.3 |
| 7,228,112 B2 | 6/2007 | Ota et al. | | |
| 7,339,600 B2 * | 3/2008 | Hwang | ........................ | 345/659 |
| 2003/0064758 A1 * | 4/2003 | Mizuta et al. | ............... | 455/566 |
| 2003/0190896 A1 | 10/2003 | Ota et al. | | |
| 2004/0203532 A1 * | 10/2004 | Mizuta | ...................... | 455/90.3 |
| 2004/0242289 A1 * | 12/2004 | Jellicoe et al. | ........... | 455/575.1 |

FOREIGN PATENT DOCUMENTS

| | | |
|---|---|---|
| GB | 2299192 A | 9/1996 |
| JP | 04066617 U | 6/1992 |

(Continued)

OTHER PUBLICATIONS

Japanese language office action and its English language translation for corresponding Japanese application 2003307224 lists the references above.

*Primary Examiner*—Patrick N Edouard
*Assistant Examiner*—Julio Perez
(74) *Attorney, Agent, or Firm*—Hogan & Hartson LLP (57) ABSTRACT

Damage to a bearing section and cases is able to be prevented in a portable terminal device in which two cases are mutually and rotatably coupled about an axis that extends in the direction in which they overlap, and the range of the relative movement of the two cases is restricted. This portable terminal device is provided with two cases arranged so as to be able to be mutually overlapped, a coupling unit that mutually and rotatably couples the two cases about an axis extending in the direction of overlapping, and a reinforcing member that is fixed within one case of the two cases. The coupling unit is provided on the other case of the two cases, has a hollow rotation shaft having the axis for its center line and a bearing section that rotatably axially supports the rotation shaft, and the bearing section is attached to the reinforcing member.

18 Claims, 6 Drawing Sheets

FOREIGN PATENT DOCUMENTS

| | | |
|---|---|---|
| JP | 07-288860 | 10/1995 |
| JP | 08265404 A | 10/1996 |
| JP | 2001050244 A | 2/2001 |
| JP | 2002290522 A | 10/2002 |
| JP | 2002314313 A | 10/2002 |
| JP | 2002344592 A | 11/2002 |
| JP | 2003134205 A | 5/2003 |
| JP | 2003174495 A | 6/2003 |

* cited by examiner

PORTABLE TERMINAL DEVICE

BACKGROUND OF THE INVENTION

1. Field of the Invention

The present invention relates to a portable terminal device such as a cellular telephone or personal digital assistant (PDA) comprised by mutually and pivotally coupling two cases.

Priority is claimed on Japanese Patent Application No. 2003-307224, filed on Aug. 29, 2003, the content of which is incorporated herein by reference.

2. Description of Related Art

An example of a conventional portable terminal device had two cases and was provided with a coupling section that mutually and pivotally couples the two cases arranged so as to be able to be mutually overlapped about an axis along the direction in which both cases are overlapped (see, for example, Japanese Unexamined Patent Application, First Publication No. H07-288860). In a portable terminal device employing this type of constitution, a through hole is formed in a rotation shaft that composes the coupling section that allows the inner space of the two cases to mutually pass through. A cable is disposed in this through hole that mutually electrically connects circuit boards arranged within the two cases. This cable transmits electrical signals which are exchanged between the circuit boards arranged in both cases, and power is supplied to one of the cases from a battery provided in the other case.

In this type of portable terminal device, since the cable is twisted in the pivoting direction when the two cases are mutually pivoted, the relative pivoting range of the two cases is restricted for the purpose of preventing disconnection of the cable as a result of this twisting. In addition, the rotation shaft is rotatably supported relative to one case by a bearing section provided in the other case.

However, in a conventional portable terminal device, when a user has applied external force that causes the two cases to mutually pivot beyond the predetermined pivoting range, force acts which attempts to incline the center line of the rotation shaft towards the axis, and since stress concentrates in the bearing section and case mounting section that anchors the bearing section, there was the risk of damage to the case mounting section because its strength was not that particularly high.

Furthermore, although forming the case provided with the bearing section to have greater thickness was considered as a way of resolving this problem, due to the requirements in recent years for reduced size and thickness of portable terminal devices for the purpose of improving the portability of portable terminal devices, this solution is not desirable.

SUMMARY OF THE INVENTION

In consideration of the aforementioned circumstances, an object of the present invention is to provide a portable terminal device capable of preventing damage to the bearing section and cases even if an external force acts on the bearing section and cases which causes the two cases to mutually rotate beyond a predetermined pivoting range.

In order to achieve the aforementioned object, the portable terminal device according to the present invention is provided with: two cases arranged to be able to be mutually overlapped; a coupling unit that mutually and rotatably couples the two cases about an axis extending in the direction of overlapping; and a reinforcing member that is fixed within one of the two cases, wherein the coupling unit comprises: a hollow rotation shaft that is rotatable about the axis, and a bearing section that axially supports the rotation shaft so as to allow rotation of the rotation shaft, and the bearing section is attached to the reinforcing member.

In addition, the portable terminal device according to the present invention may further comprise: a circuit board within one of the cases; and a position detection unit that detects the relative positions of the two cases, and the position detection unit may be provided with: a magnet located near the periphery of the axis and fixed to the other case; and magnetic sensors that are provided on the circuit board so as to oppose to predetermined locations of movement path of the magnet about the axis and that detect the magnetism of the magnet.

Moreover, in the portable terminal device according to the present invention, together with being a plate-shaped body formed from a metal material, the reinforcing member may be arranged so as to be located between the magnet and the circuit board, through holes may be provided in the reinforcing member that pass there through in the direction of thickness thereof, and the magnetic sensors may be arranged within the through holes.

In addition, in the portable terminal device according to the present invention, the magnetic sensors may also be provided in pairs at symmetrical locations on both sides of the axis.

In addition, in the portable terminal device according to the present invention, the reinforcing member may also be composed of a material having greater strength than the material that forms one of the cases.

In addition, in the portable terminal device according to the present invention, the reinforcing member may be made of metal material.

In addition, in the portable terminal device according to the present invention, the coupling unit may couple end sections of the two cases.

In addition, in the portable terminal device according to the present invention, a second reinforcing member may be provided in the other of the two cases, and the rotation shaft may be fixed to the second reinforcing member.

In addition, the portable terminal device according to the present invention may be a cellular telephone in which an operating section and a microphone section are provided on an outer surface of one of the two cases that opposes the other of the two cases and a display section and a speaker section are provided on an outer surface of the other of the two cases.

In addition, in the portable terminal device according to the present invention, an electro-acoustic transducer section may be provided on the outer surface of the other of the two cases at an end section opposite from the coupling unit, the speaker section may be provided at an end section of the coupling unit side, and the function of the electro-acoustic transducer section may be switched based on the result of detection by the position detection unit so as allow the electro-acoustic transducer section to function as a speaker or a microphone at least in the state in which call is made.

In addition, in the portable terminal device according to the present invention, the electro-acoustic transducer section may function as the microphone in the state in which the two cases are mutually overlapped, and the electro-acoustic transducer section may function as the speaker in the state in which the two cases are mutually pivoted 180° from the state in which the two cases are mutually overlapped.

In addition, in the portable terminal device according to the present invention, the direction of information displayed on the display section may be switched based on the result of detection by the position detection unit.

In addition, in the portable terminal device according to the present invention, both the magnet and the magnetic sensors that constitute the position detection unit may be not exposed to the outside of the portable terminal device.

In addition, in the portable terminal device according to the present invention, a circuit board may be provided in one of the two cases, an electrical component may be provided in the other of the two cases, the rotation shaft may comprise a through hole, and the circuit board may be electrically connected to the electrical component via a cable that is inserted into the through hole.

In addition, in the portable terminal device according to the present invention, the reinforcing member and the circuit board may be provided in one of the two cases so that the reinforcing member is closer to a surface that opposes the other of the two cases than the circuit board, and insertion holes into which the magnetic sensors are inserted may be provided at portions of the reinforcing member that oppose the magnetic sensors.

In addition, the portable terminal device according to the present invention may further comprise a position detection unit that detects the relative positions of the two cases, and the position detection unit may comprise: a magnet and magnetic sensors that detect the magnetism of the magnet, and one of the two cases may comprise the magnet, and the other of the two cases may comprise the magnetic sensors.

According to the present invention, as a result of providing a bearing section of a coupling unit in a reinforcing member within a case, even if external force acts on the rotation shaft which causes the center line of the rotation shaft to fluctuate relative to the axis, the amount of stress that acts on the case can be reduced, thereby preventing the case from being damaged.

DETAILED DESCRIPTION OF THE INVENTION

FIGS. 1 through 5 show an embodiment according to the present invention, and the embodiment explained here refers to the case of applying the present invention to a cellular telephone.

Figure 1:
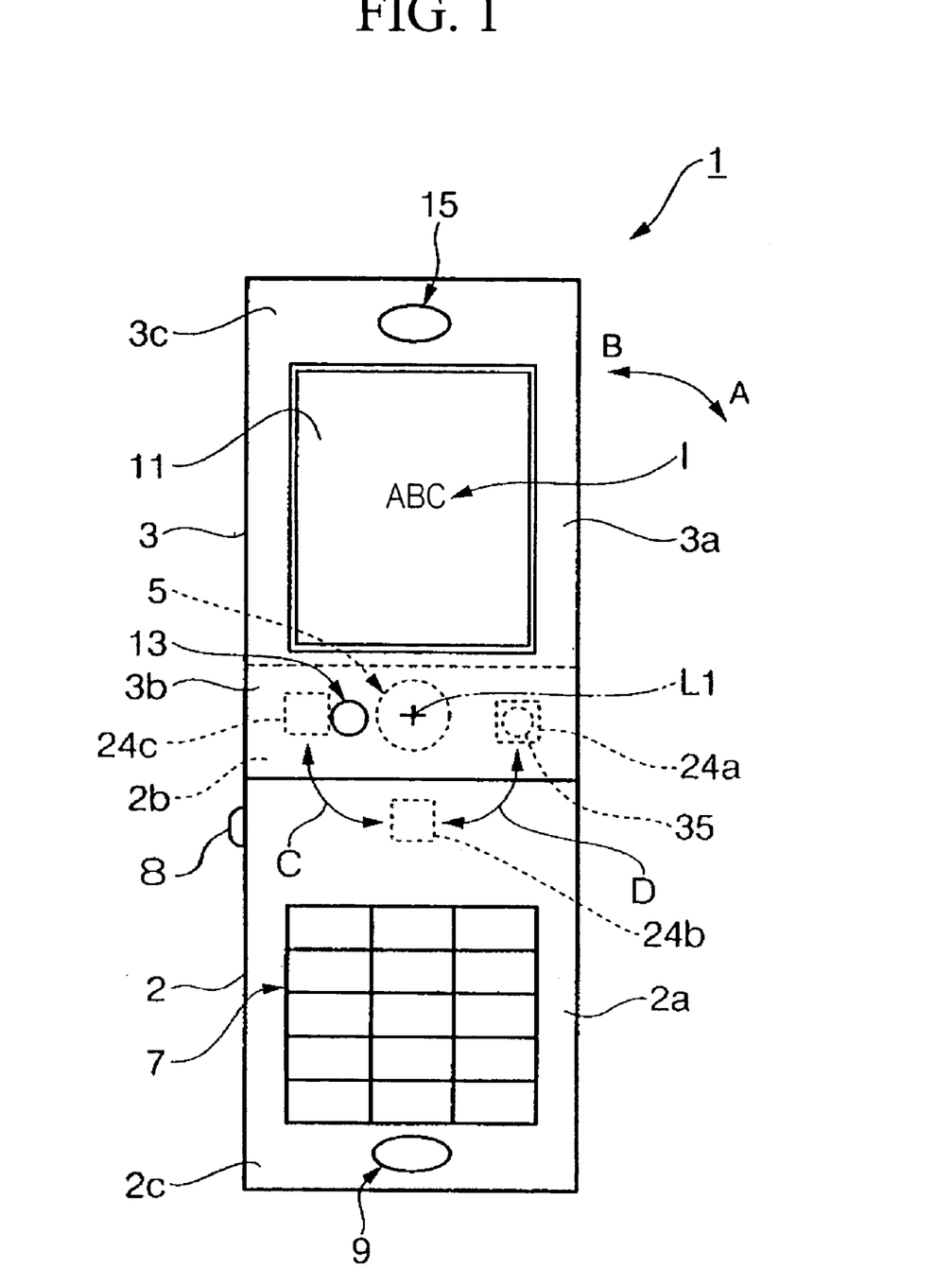
FIG. 1 is a schematic plan view showing the state in which first and second cases that compose a cellular telephone according to an embodiment of the present invention are mutually opened.

As shown in FIG. 1, a cellular telephone (portable terminal device) 1 according to the present embodiment is provided with a first case 2, a second case 3 capable of being mutually overlapped with first case 2 in the direction of thickness, and a coupling unit 5 that pivotally couples these two cases 2 and 3 about a reference axis L1 extending in the direction of their overlapping. Furthermore, coupling unit 5 is made to couple each end section 2b and 3b (to be referred to as proximal end sections 2b and 3b) of the two cases 2 and 3.

An operating section 7 composed of a call key, end key, number keys and various other pressable operating keys is provided on inner surface 2a of first case 2 that opposes second case 3 when they are overlapped. In addition, a microphone section 9 is provided in distal end section 2c of first case 2 located on the opposite side from proximal end section 2b on inner surface 2a. This operating section 7 and microphone section 9 are hidden by second case 3 in the state in which the first and second cases 2 and 3 are closed by mutually overlapping.

A display section 11, such as a liquid crystal display device that displays various information, is provided on outer surface 3a of second case 3 facing roughly in the same direction as inner surface 2a of first case 2. In addition, also on this outer surface 3a, a speaker section 13 is provided in proximal end section 3b of second case 3, while an electro-acoustic transducer section 15 is provided in distal end section 3c of second case 3 located on the opposite side from proximal end section 3b.

Figure 2:
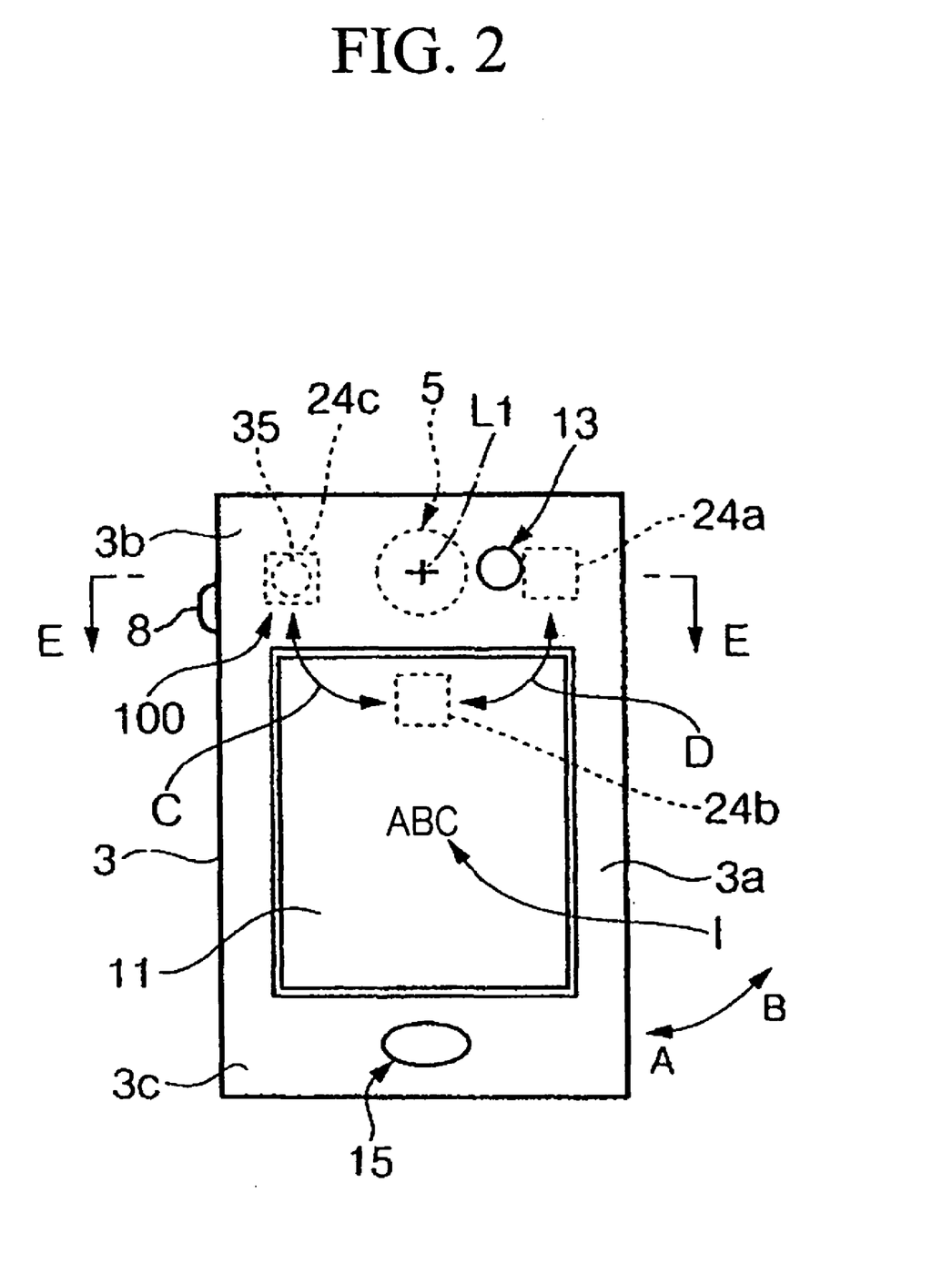
FIG. 2 is a schematic plan view showing the state in which the first and second cases are mutually closed in the cellular telephone of FIG. 1.

Electro-acoustic transducer section 15 functions as an ear speaker that is used with microphone section 9 of first case 2 to make calls in the state in which the two cases 2 and 3 are mutually open (state shown in FIG. 1). In addition, as shown in FIG. 2, this electro-acoustic transducer section 15 functions as a microphone that is used with speaker section 13 to make calls in the state in which the two cases 2 and 3 are closed by overlapping by mutually pivoting 180° about reference axis L1 from the state in which they are open. This display section 11, speaker section 13 and electro-acoustic transducer section 15 are exposed to the outside regardless of the open or closed state of the two cases 2 and 3.

Furthermore, this second case 3 is only allowed to pivot clockwise (direction A) about reference axis L1 relative to first case 2 in the state in which both cases 2 and 3 are open. In addition, in the state in which both cases 2 and 3 are closed, second case 3 is only allowed to pivot counter-clockwise (direction B) about reference axis L1 relative to first case 2. Namely, the pivotable range of second case 3 relative to first case 2 is 180°.

In addition, reference symbol 8 indicates an auxiliary operating section in the form of a jog dial and so forth provided on the lateral surface of first case 2, and in the case in which an incoming call has been received in the state in which both cases 2 and 3 are mutually closed, the incoming call can be received by pressing auxiliary operating section 8 into case 2. In addition, in the case of starting up an application installed in cellular telephone 1 in the aforementioned closed state, a menu screen is displayed in display section 11 by pressing auxiliary operating section 8 into case 2, and after subsequently selecting a predetermined application by rotating auxiliary operating section 8, by again pressing auxiliary operating section 8, the predetermined application can be started up and the menu screen is displayed on display section 11.

Figure 3:
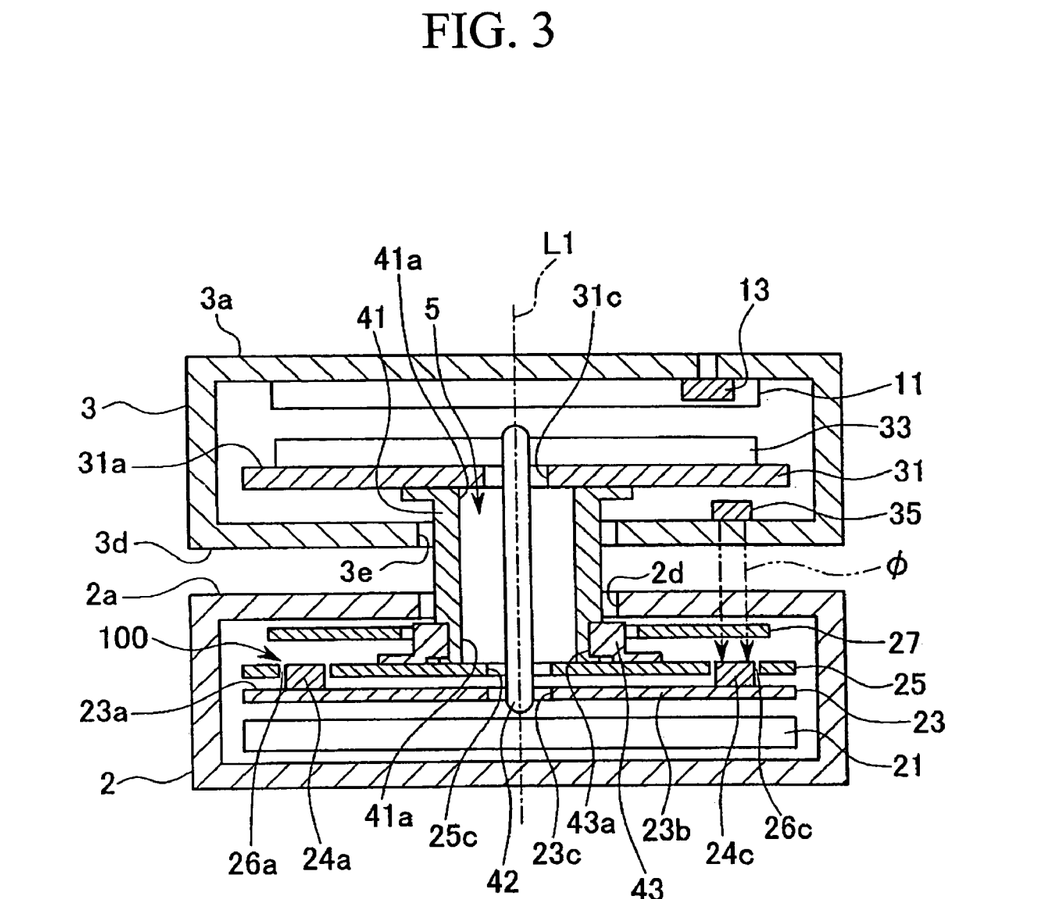
FIG. 3 is a cross-sectional view taken along arrows E-E of FIG. 2.
Figure 4:
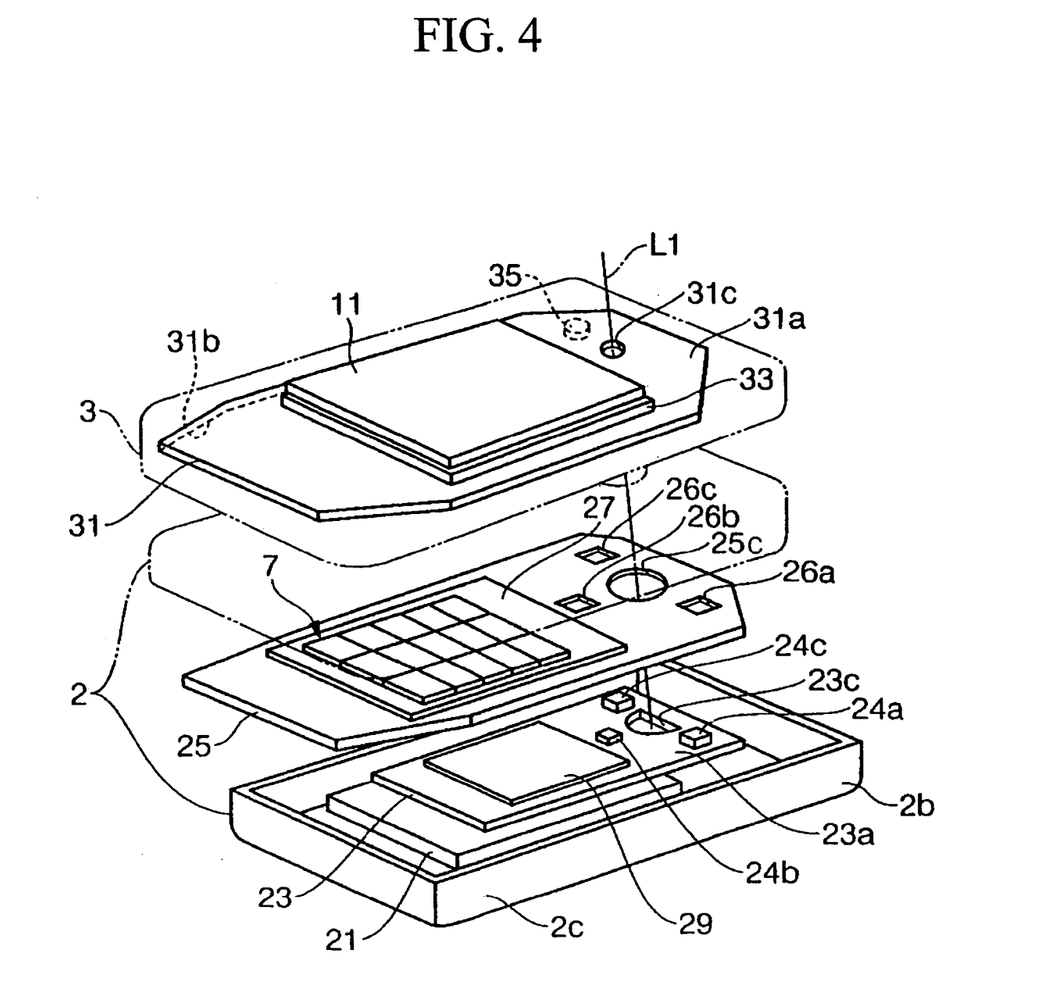
FIG. 4 is a schematic perspective view showing an internal structure of the first and second cases in the cellular telephone of FIG. 1.

As shown in FIGS. 3 and 4, a plate-shaped battery 21, first circuit board 23, first reinforcing plate 25 and operating key board 27 are sequentially arranged within first case 2 in the form of layers towards inner surface 2a of first case 2 along reference axis L1. Battery 21 supplies electrical power to various electrical and electronic components installed in cellular telephone 1 such as operating section 7 and display section 11.

Three magnetic sensors 24a through 24c comprised of a magnetic resistor element, a Hall IC element and so forth are mounted on front surface 23a of first circuit board 23 opposing first reinforcing plate 25. These magnetic sensors 24a through 24c are arranged circumferentially on the same circle about reference axis L1, and near the periphery of through hole 23c formed in first circuit board 23.

First and third magnetic sensors 24a and 24c are arranged at symmetrical locations juxtaposed about reference axis L1, and the direction in which they are arranged is perpendicular to the lengthwise direction extending from proximal end section 2b towards distal end section 2c of first case 2. In addition, second magnetic sensor 24b is located on the side of distal end section 2c of first case 2 relative to reference axis L1 so as to be perpendicular to the direction in which the two magnetic sensors 24a and 24c are arranged.

Furthermore, a control section 29 is also provided on this first circuit board 23 composed of a plurality of electronic components that control various functions such as calling functions and electronic mail functions.

First reinforcing plate 25 is composed of a metal material such as magnesium alloy or aluminum alloy having a higher strength than the material that forms first case 2, is in the form of a plate-shaped body of which its planar shape is roughly the same as the planar shape within first case 2, and is fixed within first case 2. By providing the first reinforcing plate 25 within first case 2 in this manner, even if a moment such as twisting acts on first case 2, damage to case 2 can be prevented by preventing deformation of case 2.

In addition, three through holes 26a through 26c are provided in first reinforcing plate 25 that pass through reinforcing plate 25 in the direction of its thickness. These three through holes 26a through 26c are formed so as to allow insertion of the aforementioned three magnetic sensors 24a through 24c, respectively.

Operating key board 27 has various keys that compose the aforementioned operating section 7 arranged on its front surface, and is electrically connected to first circuit board 23 together with the aforementioned microphone section 9.

A second reinforcing plate 31 is fixed within second case 3. A second circuit board 33, which is electrically connected with the aforementioned display section 11, speaker section 13 and electro-acoustic transducer section 15, is provided on front surface 31a of second reinforcing plate 31 facing the side of outer surface 3a of second case 3. The aforementioned display section 11, speaker section 13 and electro-acoustic transducer section 15 are electrically connected to this second circuit board 33. Furthermore, reference symbol 31b indicates the back surface of second reinforcing plate 31.

In addition, a magnet 35 is fixed by adhesion to inner wall 3d of second case 3 in opposition to inner surface 2a of first case 2. This magnet 35 is arranged so that its lines of magnetic force Φ are directed towards the side of first case 2 along reference axis L1, and when the two cases 2 and 3 are mutually pivoted, moves along movement paths C and D that pass the three magnetic sensors 24a through 24c as shown in FIG. 2.

Namely, in the case magnet 35 and third magnetic sensor 24c are overlapping in the direction of reference axis L1, third magnetic sensor 24c detects the magnetism of magnet 35 and detects that the two cases 2 and 3 are in the mutually closed state as shown in FIG. 2. In addition, in the case magnet 35 and second magnetic sensor 24b are overlapping in the direction of reference axis L1, second magnetic sensor 24b detects the magnetism of magnet 35 and detects that lengthwise directions of the two cases 2 and 3 mutually form an angle of 90° (state shown in FIG. 5). Moreover, in the case magnet 35 and first magnetic sensor 24a are overlapping in the direction of reference axis L1, first magnetic sensor 24a detects the magnetism of magnet 35 and detects that the two cases 2 and 3 are in the mutually open state. Furthermore, since magnetic sensors 24a through 24c are inserted in through holes 26a through 26c, respectively, in the state in which magnetic sensors 24a through 24c and magnet 35 are opposed in the direction of reference axis L1, first reinforcing plate 25 made of a metal material is not interposed between magnetic sensors 24a through 24c and magnet 35. Consequently, magnetic sensors 24a through 24c are able to reliably detect the magnetic flux from magnet 35.

Position detection unit 100, which detects the relative positions of the two cases 2 and 3, is composed by these three magnetic sensors 24a through 24c and magnet 35.

Figure 5:
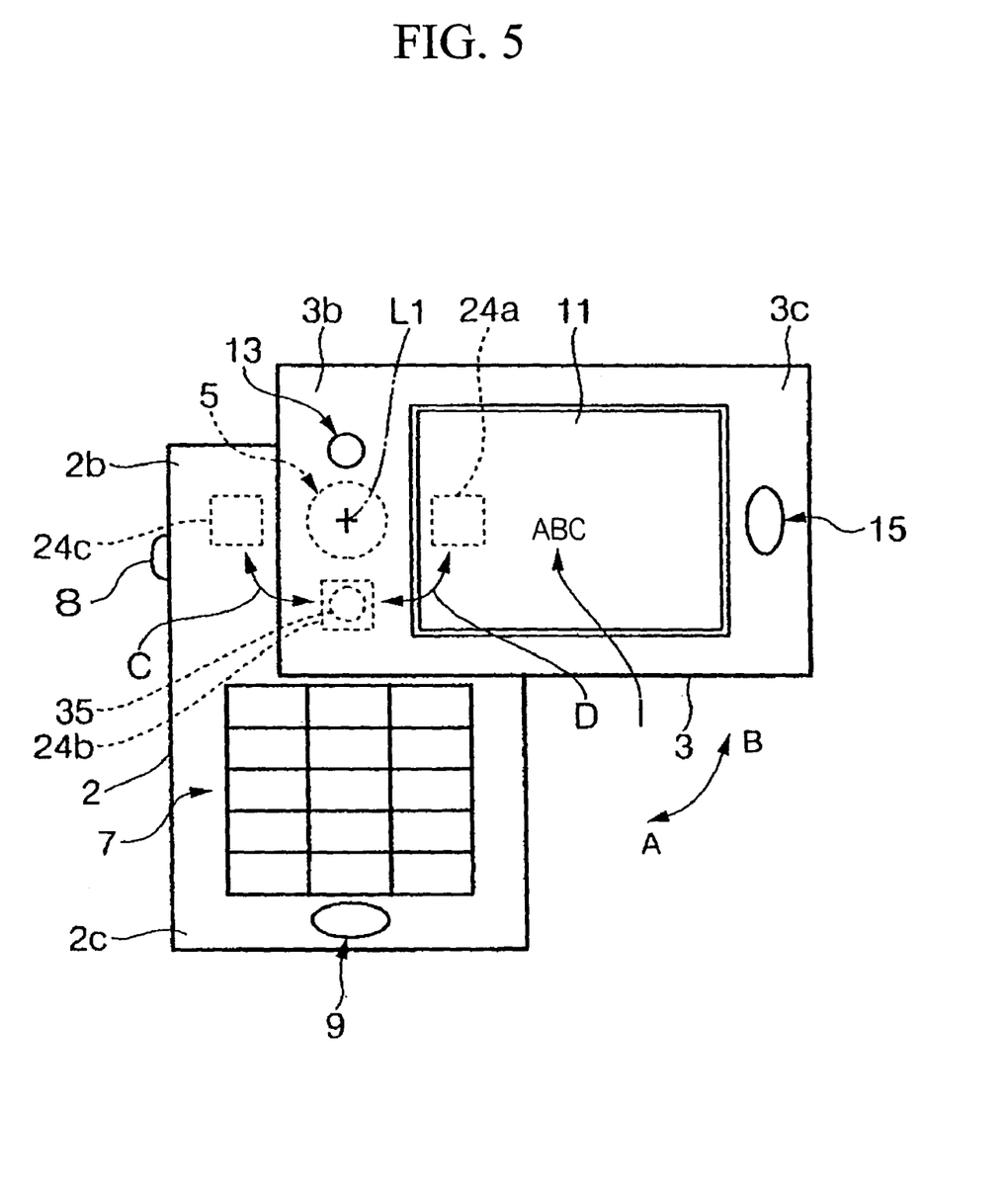
FIG. 5 is a schematic plan view showing the state in which the first and second cases are mutually positioned at an angle of 90° in the cellular telephone of FIG. 1.

This position detection unit 100 is composed so as to start each function of cellular telephone 1 corresponding to the relative positions of the two cases 2 and 3 when the two cases 2 and 3 are mutually pivoted. Namely, in the case, for example, second case 3 is pivoted in direction B relative to first case 2 from the state in which both cases 2 and 3 are mutually closed so that the positional relationship between the two cases 2 and 3 forms an angle of 90° as shown in FIG. 5, the display direction of information I on display section 11 is changed from the lengthwise direction of second case 3 that connects the proximal end section 3b and distal end section 3c of second case 3 to the direction perpendicular to this lengthwise direction based on the detection results of position detection unit 100.

In addition, in the case second case 3 is further pivoted in direction B from this state so that the two cases 2 and 3 are mutually open as shown in FIG. 1, the display direction of information I on display section 11 is changed to be facing 180° in the opposite direction relative to the display direction in the state in which the two cases 2 and 3 are closed based on the detection results of position detection unit 100.

As shown in FIG. 3, coupling unit 5 is provided with a roughly cylindrical rotation shaft 41, and a bearing section 43 that axially supports rotation shaft 41 while allowing it to rotate freely.

One end of rotation shaft 41 is provided on the side of second case 3 by attaching using screws and so forth to second reinforcing plate 31 provided within second case 3, while the other end of rotation shaft 41 protrudes in the direction of reference axis L1 from through hole 3e opened in inner wall 3d located on the back side of outer surface 3a of second case 3.

Proximal end section 2b of first case 2 has a through hole 2d that passes through the inner space from its inner surface 2a, and the other end of rotating shaft 41 provided on the side of second case 3 is made to pass through it.

In addition, bearing section 43 is fastened using screws and so forth on first reinforcing plate 25 provided within first case 2, and is made to axially support rotation shaft 41 inserted through the through hole 2d while allowing to rotate freely.

Namely, an insertion hole 43a is provided in the center of bearing section 43, and the axis of this insertion hole 43a is composed so as to coincide with the aforementioned reference axis L1, enabling the aforementioned rotation shaft 41 to be axially supported by being rotatably inserted into insertion hole 43a.

In addition, together with the aforementioned rotation shaft 41 being provided with a through hole 41a that mutually connects the inner spaces of the two cases 2 and 3 by passing through in the direction of reference axis L1, the aforementioned first circuit board 23, first reinforcing plate 25 and second reinforcing plate 31 have through holes 23c, 25c and 31c, respectively that pass through in the direction of reference axis L1, while first and second circuit boards 23 and 33 respectively provided in each case 2 and 3 are mutually electrically connected by a cable 42 through each of the aforementioned through holes 41a, 23c, 25c and 31c.

In addition to transmitting information by electrical signals between the two circuit boards 23 and 33, cable 42 is able to supply electrical power of battery 21 to display section 11, speaker section 13, electro-acoustic transducer section 15 and various electronic components mounted on second case 3 via first and second circuit boards 23 and 33.

The following provides an explanation of the operation of cellular telephone 1 composed in the manner described above.

In the case of carrying this cellular telephone 1 inside a briefcase or pocket of an article of clothing, the two cases 2 and 3 are in the closed state as shown in FIG. 2. In the case, for example, an incoming call has been received while in this state, the line is connected by pressing auxiliary operating section 8 and call is made with speaker section 13 functioning as a receiver and electro-acoustic transducer section 15 functioning as a transmitter. In addition, in the case of viewing, for example, incoming electronic mail or browsing Internet web pages, various information displayed on display section 11 can be visualized.

In addition, in order to operate operating section 7 in the case of, for example, drafting a document for electronic mail or inputting a telephone number, second case 3 is pivoted 180° about reference axis L1 relative to first case 2 from the state shown in FIG. 2, thereby mutually opening cases 2 and 3 so as to expose operating section 7 to the outside.

When performing this opening operation, in the case of, for example, a user inadvertently attempting to pivot second case 3 in direction A relative to first case 2, although an external force that attempts to incline center line of rotating shaft 41 relative to reference axis L1 acts on rotation shaft 41, since bearing section 43 is fastened to reinforcing plate 25, which is stronger than the material of first case 2, stress is not concentrated in first case 2. Consequently, even if an inadvertent external force has acted on coupling unit 5, damage to first case 2 can be prevented. This generation of stress can be similarly prevented in the case of attempting to pivot second case 3 in direction B relative to first case 2 from the state in which the two cases 2 and 3 are mutually open.

As has been described above, according to this cellular telephone 1, since bearing section 43 that composes coupling unit 5 is fastened to reinforcing plate 25 composed of a material having higher strength than the material that forms first case 2 instead of being attached directly to first case 2, damage to first case 2 can be prevented.

In addition, position detection unit 100 is composed of magnet 35 and three magnetic sensors 24a through 24c. Since this is a so-called non-contact detection unit, deterioration of the detection unit due to friction and so forth can be prevented as compared with contact types of detection units.

Moreover, since magnet 35 that composes this position detection unit 100 is arranged within second case 3 and is not exposed to the outside of second case 3, a cellular telephone 1 can be provided that has an attractive appearance.

In addition, as a result of arranging magnet 35 and magnetic sensors 24a through 24c in the vicinity of coupling unit 5, the surplus space in first and second cases 2 and 3 around coupling unit 5 can be utilized effectively.

Moreover, by forming through holes 26a through 26c through which magnetic sensors 24a through 24c pass in first reinforcing plate 25, first reinforcing plate 25 and first circuit board 23 can be arranged in close proximity, and as a result, together with effectively preventing increased thickness of first case 2 despite being provided with first reinforcing plate 25, since the magnetism of magnet 35 can be reliably detected by magnetic sensors 24a through 24c, a ferrite, Fe—Al—Ni—Co or other low-magnetism magnet can be used for magnet 35, thereby making it possible to reduce the production cost of cellular telephone 1.

In addition, since position detection unit 100 has magnetic sensors 24a through 24c mounted on first circuit board 23, lead wires and other wiring is not required, thereby facilitating the production of cellular telephone 1.

Furthermore, although bearing section 43 is provided on first reinforcing plate 25 provided within first case 2, and rotation shaft 41 formed in second case 3 is axially supported while allowing to rotate freely by this bearing section 43 in the aforementioned embodiment, the present invention is not limited to this, but rather, for example, a rotation shaft may be integrally formed on first reinforcing plate 25 of first case 2, and a bearing section may be respectively provided on second reinforcing plate 31 arranged within second case 3. In addition, the rotation shaft is not limited to being integrally formed in the case, but rather, for example, together with forming the rotation shaft from a separate single member, a coupling unit may be composed by providing two bearing sections in the two cases, respectively.

In addition, although the open and closed state of the two cases 2 and 3 as well as the state in which the two cases 2 and 3 mutually form an angle of 90° were made to be detected using three magnetic sensors 24a through 24c, the present invention is not limited to this, but rather at least the open and closed state of two cases 2 and 3 should be able to be detected. Thus, position detection unit 100 may also employ a constitution in which, for example, the second magnetic sensor 24b is omitted or a constitution in which the first and second magnetic sensors 24a and 24b are omitted.

Figure 6:
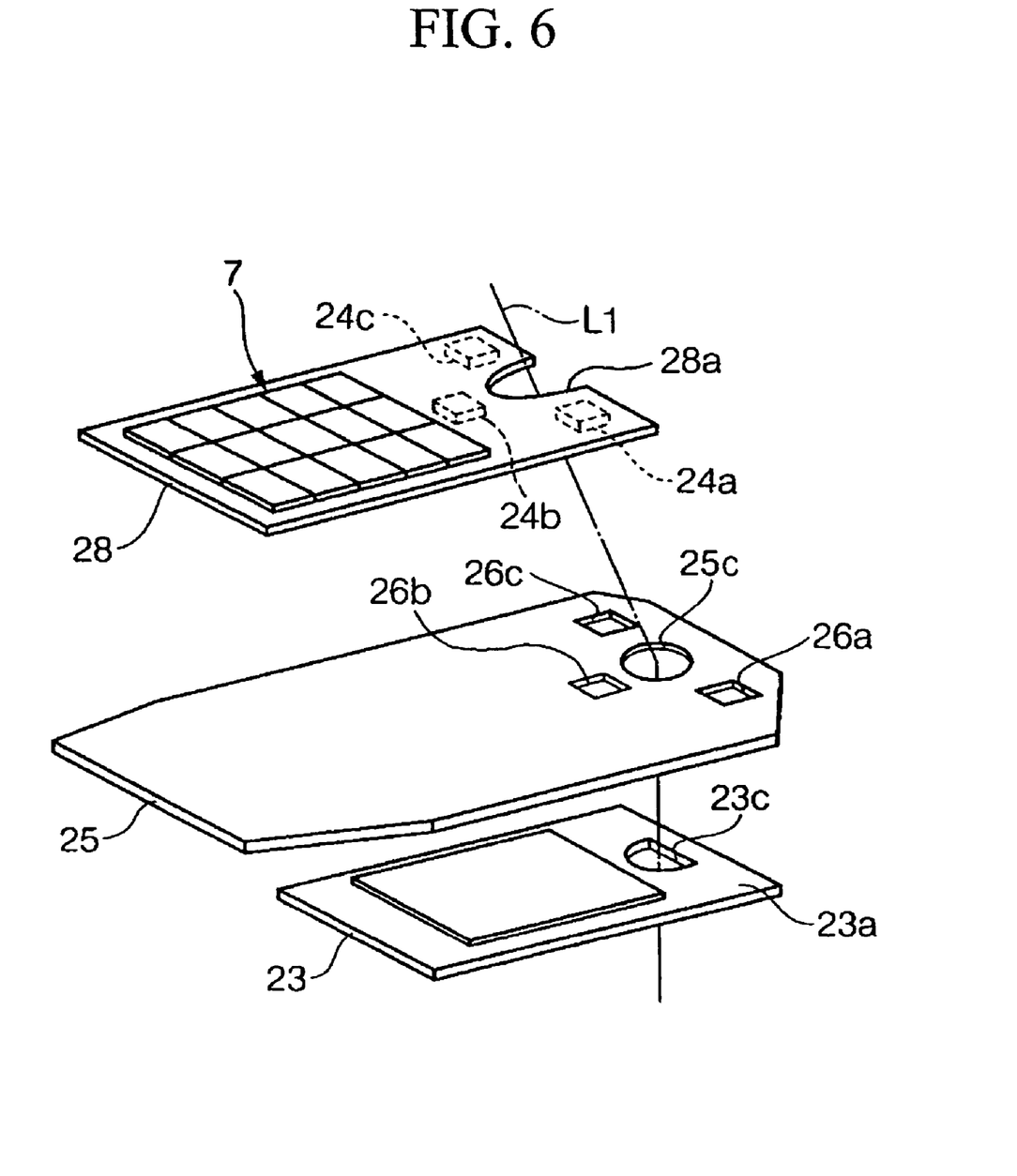
FIG. 6 is a schematic perspective view showing the arrangement of magnetic sensors in a cellular telephone according to another embodiment of the present invention.

Moreover, although the first through third magnetic sensors 24a through 24c were made to be mounted on front surface 23a of first circuit board 23, the present invention is not limited to this, but rather, as shown in FIG. 6 for example, they may also be mounted on an operating key board (circuit board) provided with operating section 7.

In this case of this constitution, although operating key board 28 is interposed between magnet 35 and magnetic sensors 24a and 24c, since the magnetism of magnet 35 is not weakened as with first reinforcing member 25, a ferrite, Fe—Al—Ni—Co or other low-magnetism magnet can be used for magnet 35 in the same manner as the aforementioned embodiment.

In this constitution, since it is necessary to form operating key board 28 to the periphery of reference axis L1, a notch section 28a is formed in operating key board 28a for a rotation shaft to pass through. In addition, in this constitution, together with providing magnetic sensors 24a through 24c on the opposite side of operating key board 28, the three magnetic sensors 24a through 24c are preferably allowed to pass through the through holes 26a through 26c of first reinforcing plate 25 so as not to increase the thickness of first case 2.

In addition, although magnet 35 was made to be fastened by adhering to the inner wall of second case 3, the present invention is not limited to this, but rather, for example, an indentation may be formed in inner wall 3d of second case 3, and magnet 35 may be fixed in this indentation by adhesion and so forth. In this case as well, since magnet 35 is not exposed to the outside, the attractive appearance of cellular telephone 1 is prevented from being impaired.

Moreover, magnet 35 is not limited to being fastened to second case 3, but rather it may be fastened to second circuit board 33 so as to at least move along movement paths C and D.

Moreover, although electro-acoustic transducer section 15 was made to function as a microphone in the state in which the two cases 2 and 3 are mutually closed, the present invention is not limited to this, but rather may be composed so as to at least allow calls to be made in the state in which the two cases 2 and 3 are mutually closed.

In addition, the present invention is not limited to cellular telephone 1, but rather, for example, may also be a portable terminal device such as a PDA or laptop computer in which two cases are coupled while allowing to pivot and open and close freely by a coupling unit.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable terminal device comprising:
two cases arranged to be able to be mutually overlapped;
a coupling unit that mutually and rotatably couples the two cases about an axis extending in the direction of overlapping;
a reinforcing member that is fixed within one of the two cases and is arranged between a first circuit board and an operating key board; and
a position detection unit that detects the relative positions of the two cases, wherein
the coupling unit comprises: a hollow rotation shaft that is rotatable about the axis of overlap; and a bearing section that axially supports the rotation shaft so as to allow rotation of the rotation shaft, and the bearing section is attached to the reinforcing member,
the first circuit board is provided within one of the cases, and
the position detection unit comprises: a magnet located near the periphery of the axis and fixed to the other case; and magnetic sensors that are provided on the first circuit board so as to oppose predetermined locations of movement path of the magnet about the axis and that detect the magnetism of the magnet.

2. The portable terminal device according to claim 1, wherein together with the reinforcing member being a plate-shaped body formed from a metal material, the reinforcing member is arranged so as to be located between the magnet and the first circuit board, through holes are provided in the reinforcing member that pass there through in the direction of thickness thereof, and the magnetic sensors are arranged within the through holes.

3. The portable terminal device according to claim 2, wherein the magnetic sensors are provided in pairs at symmetrical locations on both sides of the axis.

4. The portable terminal device according to claim 1, wherein the magnetic sensors are provided in pairs at symmetrical locations on both sides of the axis.

5. The portable terminal device according to claim 1, wherein the reinforcing member is composed of a material having greater strength than the material that forms one of the cases.

6. The portable terminal device according to claim 5, wherein the reinforcing member is made of metal material.

7. The portable terminal device according to claim 1, wherein the coupling unit couples end sections of the two cases.

8. The portable terminal device according to claim 1, wherein a second reinforcing member is provided in the other of the two cases, and the rotation shaft is fixed to the second reinforcing member.

9. The portable terminal device according to claim 1, wherein the portable terminal device is a cellular telephone in which an operating section and a microphone section are provided on an outer surface of one of the two cases that opposes the other of the two cases and a display section and a speaker section are provided on an outer surface of the other of the two cases.

10. The portable terminal device according to claim 9, wherein an electro-acoustic transducer section is provided on the outer surface of the other of the two cases at an end section opposite from the coupling unit, the speaker section is provided at an end section of the coupling unit side, and the function of the electro-acoustic transducer section is switched based on the result of detection by the position detection unit so as allow the electro-acoustic transducer section to function as a speaker or a microphone at least in the state in which call is made.

11. The portable terminal device according to claim 10, wherein the electro-acoustic transducer section functions as the microphone in the state in which the two cases are mutually overlapped, and the electro-acoustic transducer section functions as the speaker in the state in which the two cases are mutually pivoted 180° from the state in which the two cases are mutually overlapped.

12. The portable terminal device according to claim 9, wherein the direction of information displayed on the display section is switched based on the result of detection by the position detection unit.

13. The portable terminal device according to claim 1, wherein both the magnet and the magnetic sensors that constitute the position detection unit are not exposed to the outside of the portable terminal device.

14. The portable terminal device according to claim 1, wherein the first circuit board is provided in one of the two cases, an electrical component is provided in the other of the two cases, the rotation shaft comprises a through hole, and the first circuit board is electrically connected to the electrical component via a cable that is inserted into the through hole.

15. The portable terminal device according to claim 1, wherein the reinforcing member and the first circuit board are provided in one of the two cases so that the reinforcing member is closer to a surface that opposes the other of the two cases than the first circuit board, and insertion holes into which the magnetic sensors are inserted are provided at portions of the reinforcing member that oppose the magnetic sensors.

16. The portable terminal device according to claim 1, wherein the reinforcing member is fixed within an inner space of one of the two cases.

17. The portable terminal device according to claim 1, wherein the reinforcing member is made of a metal material.

18. A portable terminal device comprising:
two cases arranged to be able to be mutually overlapped;
a coupling unit that mutually and rotatably couples the two cases about an axis extending in the direction of overlapping;
a reinforcing member that is fixes within one of the two cases and is arranged between a first circuit board and an operating key board; and
a position detection unit that detects the relative positions of the two cases, wherein
the coupling unit comprises: a hollow rotation shaft that is rotatable about the axis of overlap; and a bearing section that axially supports the rotation shaft so as to allow rotation of the rotation shaft, and the bearing section is attached to the reinforcing member, and
the position detection unit comprises: a magnet and magnetic sensors that detect the magnetism of the magnet, and one of the two cases comprises the magnet, and the other of the two cases comprises the magnetic sensors.

* * * * *